United States Patent
Yamamoto et al.

(10) Patent No.: US 6,189,665 B1
(45) Date of Patent: Feb. 20, 2001

(54) APPARATUS FOR DISENGAGING AND ENGAGING CLUTCH

(75) Inventors: Yasushi Yamamoto, Fujisawa; Nobuyuki Nishimura, Kawasaki; Masaki Ishihara, Fujisawa; Nobuyuki Iwao, Fujisawa; Nobutaka Sakai, Fujisawa, all of (JP)

(73) Assignee: Isuzu Motors Limited, Tokyo (JP)

(*) Notice: Under 35 U.S.C. 154(b), the term of this patent shall be extended for 0 days.

(21) Appl. No.: 09/426,837

(22) Filed: Oct. 26, 1999

(30) Foreign Application Priority Data

Oct. 28, 1998 (JP) .................................... 10-307629

(51) Int. Cl.[7] .................................................... F16D 48/10
(52) U.S. Cl. ...................................... 192/3.58; 192/111 R
(58) Field of Search ................................ 192/3.54, 3.55, 192/3.58, 110 R, 111 R

(56) References Cited

U.S. PATENT DOCUMENTS

| | | | |
|---|---|---|---|
| 4,400,997 | 8/1983 | Fiala | 74/661 |
| 4,582,182 | * 4/1986 | Takeda et al. | 192/3.31 |
| 4,629,045 | * 12/1986 | Kasai et al. | 192/3.58 X |
| 4,926,994 | * 5/1990 | Koshizawa et al. | 192/110 R |
| 5,014,832 | * 5/1991 | Satoh et al. | 192/30 W |
| 5,029,678 | * 7/1991 | Koshizawa | 192/111 A |
| 5,337,874 | * 8/1994 | Oltean et al. | 192/111 A |
| 5,393,274 | * 2/1995 | Smedley | 192/111 A X |
| 5,626,534 | * 5/1997 | Ashley et al. | 477/79 |

FOREIGN PATENT DOCUMENTS

| | | |
|---|---|---|
| 0 385 629 A2 | 9/1990 | (EP) . |
| 0 441 290 A2 | 8/1991 | (EP) . |
| 0 872 657 A1 | 10/1998 | (EP) . |
| WO98/28162 | 7/1998 | (WO) . |

* cited by examiner

Primary Examiner—Charles A Marmor
Assistant Examiner—Saul Rodriguez
(74) Attorney, Agent, or Firm—McCormick, Paulding & Huber LLP

(57) ABSTRACT

A clutch control arrangement designed to prevent intentional starting of a vehicle while a clutch-stroke-position learning is being performed. The clutch control arrangement includes a mechanism for automatically disengaging and engaging a clutch. The vehicle has a manual transmission of which gear position (shift position) is changed as a driver operates a shift lever. The clutch control arrangement further includes a learning unit for learning a stroke position of the clutch, and a unit for interrupting the operation of the learning unit when the shift lever is operated toward a transmission gear engaged position during the clutch-stroke-position learning. Preferably, the automatic disengagement and engagement mechanism automatically disengages or engages the clutch depending upon a gear engaged condition of the manual transmission after interrupting the clutch-stroke-position learning. The clutch is maintained in a disengaged condition until a clutch pedal is stamped after the automatic clutch disengagement.

7 Claims, 8 Drawing Sheets

APPARATUS FOR DISENGAGING AND ENGAGING CLUTCH

BACKGROUND OF THE INVENTION

1. Field of the Invention

The present invention relates to a clutch disengagement and engagement apparatus, and more particularly to such an apparatus that can realize automatic operation of a vehicle clutch.

2. Description of the Related Art

Automatic clutch apparatuses for automatically disengaging and engaging a friction clutch are known in the art. With the automatic clutch apparatus, a clutch engagement speed is generally reduced in a partly engaged range in order to soften or eliminate shock which would otherwise be caused upon clutch engagement. However, the partly engaged range varies with wear and deformation of the clutch as well as assembly error. Therefore, it is necessary for the apparatus to repeatedly learn the partly engaged range of the clutch.

One of recent ways of learning the partly engaged range of the clutch is called "in-neutral learning method." This is a method of studying a "drag position" of the clutch (i.e., a clutch-stroke-position at which the clutch partly engaged range or condition starts)" when a transmission is in a neutral condition and therefore it is also referred to as "drag position" study method. This approach will briefly be described below.

1) The clutch is automatically brought into a complete disengagement position after predetermined study conditions such as a transmission gear position (shift position) being a neutral, a vehicle being in standstill, etc., are met.
2) To wait until an output element (output shaft) of the clutch stops rotating.
3) When the rotation of the clutch output element stops, the clutch is automatically engaged slowly.
4) As the clutch engagement starts and the rotational speed of the clutch output element reaches a prescribed threshold value, then the clutch stroke position at that point is determined as the start of the partly engaged range.
5) The clutch is automatically brought into a complete engaged condition.

In this manner, the clutch is disengaged and engaged when the clutch-stroke-position learning is performed.

In the meantime, a manual transmission is sometimes combined with the automatic clutch apparatus so that the gear position change of the transmission is carried out by a driver's hand whereas the clutch disengagement and engagement is carried out automatically. With such combination, transmission gear engagement and disengagement is possible for a certain period since the clutch is first disengaged during the clutch-stroke-position learning. If a driver manually moves a shift lever into a particular gear position and transmission gear engagement is effected, then the vehicle will start upon clutch engagement. In particular, if the driver inadvertently causes the transmission gear engagement, the vehicle will start without driver's intention. This is not preferred.

It is also known to automatically change the gear position of the manual transmission by an actuator. If this technique is combined with the automatic clutch apparatus, the shift lever simply serves as a switch. Therefore, if movements of the shift lever are ignored by the software of the automatic clutch apparatus during the clutch-stroke-position learning, the above-described problem will easily be overcome. However, if the driver manually changes the gear position of the manual transmission by a mechanical device, the movements of the shift lever directly result in gear engagement and disengagement of the transmission gears. Thus, it is not possible to overcome the above-mentioned problem by the software design.

Other systems and methods for disengaging and engaging a clutch are disclosed in U.S. patent application Ser. Nos. 08/967,401 filed Nov. 11, 1997, Ser. No. 09/150,686 filed Sep. 10, 1998 and Ser. No. 09/207,180 filed Dec. 8, 1998, and International Patent Application No. PCT/JP98/02754 filed Jun. 19, 1998, all of which are entirely or partly assigned to the assignee of the instant application.

SUMMARY OF THE INVENTION

One of the objects of the present invention is to prevent a vehicle from starting during the clutch-stroke-position learning. Particularly, the present invention aims to prevent starting of a vehicle, which is equipped with an automatic clutch apparatus and manual transmission, during the clutch-stroke-position learning even if a vehicle driver accidentally causes the transmission gear engagement.

According to one aspect of the present invention, there is provided a vehicle including a clutch, an apparatus for automatically disengaging and engaging the clutch, a manual transmission of which gear position (shift position) is changed upon manually operating a shift lever, a controller for controlling the clutch automatic disengagement and engagement apparatus. The controller includes a learning unit for performing a clutch-stroke-position learning to detect a starting position of a partly engaged range of the clutch while the manual transmission is in a neutral position, and a unit for interrupting the operation of the clutch-stroke-position learning unit when the shift lever is operated toward a transmission gear engagement position (gear-in position) during the clutch-stroke-position learning. Since the clutch-stroke-position learning is stopped when the shift lever is moved in the transmission gear engagement position while the clutch-stroke-position learning is being carried out, the transmission gears will not be engaged. Thus, the vehicle would not start.

The interruption unit may include a sensor for detecting movements of the shift lever. This shift lever sensor may include a knob switch which is turned on in response to a predetermined intensity of force applied to the shift lever, a shift stroke sensor for detecting a shift stroke of the manual transmission, or a neutral switch for detecting if the manual transmission is in a neutral condition.

In the clutch-stroke-position learning, the starting position of the partly engaged condition of the clutch is preferably determined as follows: the clutch is automatically disengaged after predetermined study conditions are met, and then the clutch is automatically operated toward the engaged condition. When the rotational speed of an output element of the clutch reaches a prescribed value, the clutch stroke at that timing is taken as the start of the clutch partly engaged condition. It is also preferred that the automatic disengagement and engagement mechanism causes the clutch to automatically disengage after interruption of the clutch-stroke-position learning. Warning is preferably sent out as the clutch-stroke-position learning is stopped.

The clutch disengagement and engagement apparatus of the invention may further include a manual clutch disengagement and engagement device for effecting manual disengagement and engagement of the clutch in response to movements of a clutch pedal. This manual disengagement and engagement of the clutch is given priority over the automatic clutch disengagement and engagement. After interrupting the clutch-stroke-position learning, the automatic disengagement and engagement mechanism may automatically engage the clutch if the clutch pedal is stamped, whereas it may maintain the disengaged condition of the clutch if the clutch pedal is not stamped. This automatic clutch engagement may be performed at a relatively low speed.

DETAILED DESCRIPTION OF THE INVENTION

Now, embodiments of the present invention will be described in reference to the accompanying drawings.

Figure 1:
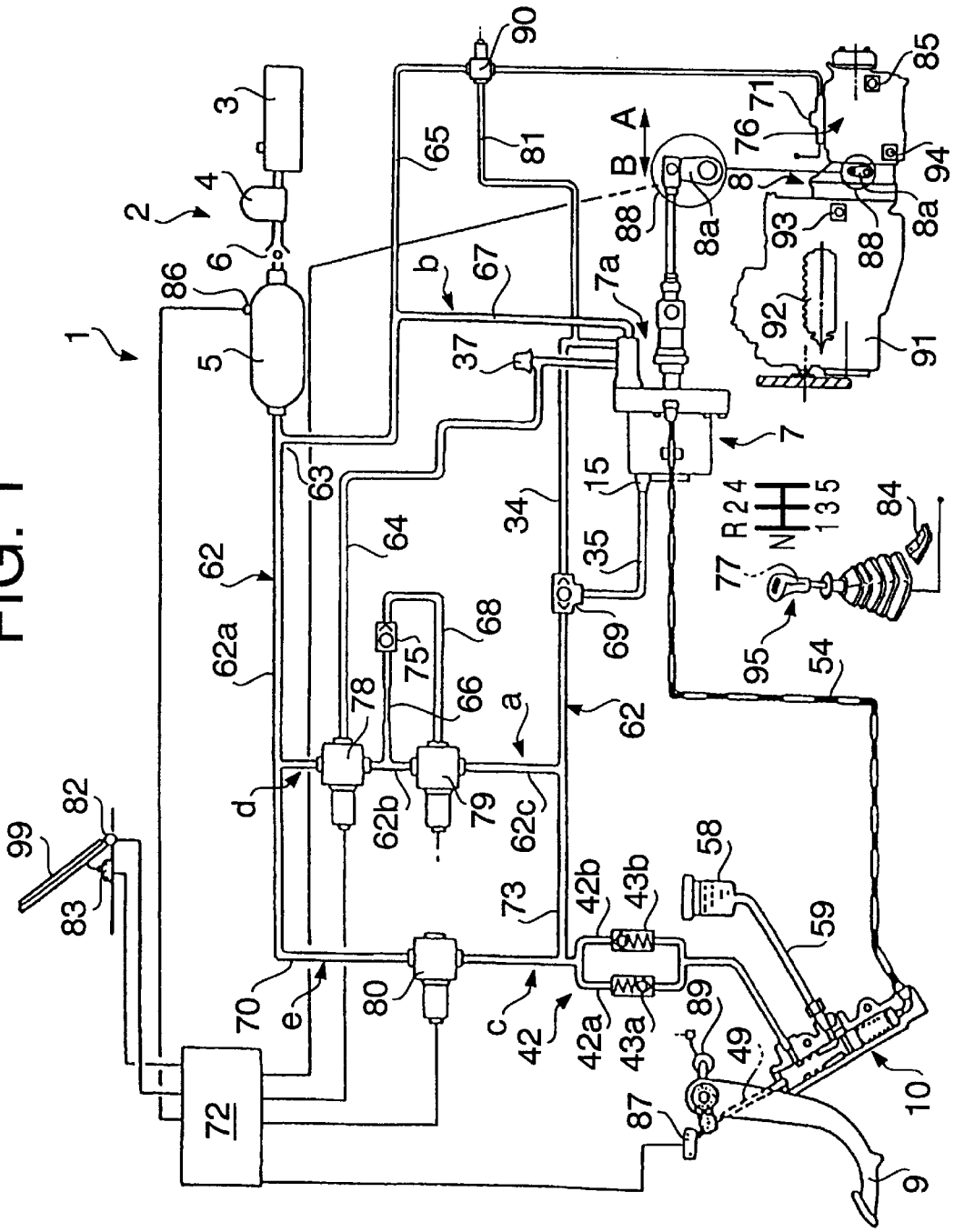
FIG. 1 illustrates an overall structure of a clutch disengagement and engagement apparatus according to the present invention.

Referring to FIG. 1, illustrated is a clutch disengagement and engagement apparatus 1 applied to a large-size vehicle such as a heavy duty truck. This clutch disengagement and engagement apparatus 1 has a structure of so-called semi-automatic clutch, which can disengage and engage a friction clutch 8 both in an automatic manner and manual manner. The illustrated clutch disengagement and engagement apparatus 1 includes an air pressure application unit 2. This air pressure unit 2 includes a compressor 3 driven by an engine 91 for generating an air pressure, an air dryer 4 for drying an air flowing from the compressor 3, an air tank 5 for reserving the air from the air dryer 4, and a check valve 6 provided at an entrance of the air tank 5. The air pressure from the air pressure unit 2 is fed to a booster (clutch booster or clutch actuator) 7. With the supplied air pressure, the clutch booster 7 moves the friction clutch 8 toward a disengagement direction A. The clutch booster 7 is also fed an oil pressure from a master cylinder 10 (will be described in detail).

Figure 2:
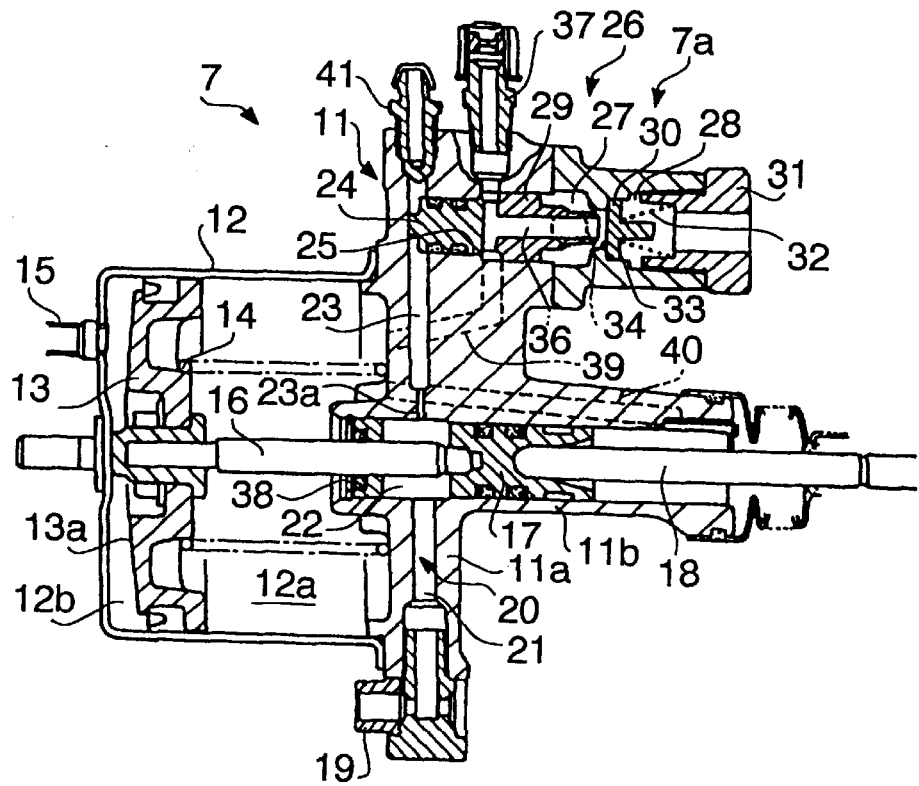
FIG. 2 illustrates an enlarged cross sectional view of a booster used in the apparatus shown in FIG. 1.

Referring to FIG. 2, illustrated is the clutch booster 7 in an enlarged scale. The booster 7 includes a main body 11 and a cylinder shell 12 attached to the main body 11. Inside the cylinder shell 12, located is a piston plate (power piston or booster piston) 13, which is biased toward an air pressure inlet (to the left in the drawing) by a return spring 14. An air pressure nipple 15 is attached to the lateral wall of the cylinder shell 12 such that it serves as an air pressure inlet. The air pressure is introduced into the booster 7 from the air tank 5 through an air pipe 35 (FIG. 1) and the nipple 15. Upon introduction of the pressurized air, the piston plate 13 is forced to the right in the drawing so that it pushes a piston rod 16, a hydraulic piston 17, and in turn a push rod 18, thereby forcing a clutch lever 8a (FIG. 1) toward the disengagement direction A. As a result, the clutch 8 is disengaged.

An oil passage 20 is defined in the booster body 11. An oil inlet is formed by an oil nipple 19. A downstream end of an oil pipe 54 is connected to the oil nipple 19. The oil passage 20 includes a bore 21 formed in a lower half of a booster body flange 11a, a hydraulic cylinder 22 formed in a body cylinder 11b for accommodating the hydraulic piston 17, and a control bore 23 formed in an upper half of the booster body flange 11a. The control bore 23 is in fluid communication with the hydraulic cylinder 22 via a small hole 23a. A control cylinder 25 extends to the right from the control bore 23. As the oil pressure is introduced from the oil nipple 19, it flows in the above-described passage and reaches the control bore 23, thereby pushing a control piston 24 to the right inside the control cylinder 25. In this manner, a control valve unit 7a is formed at an upper right area of the booster body flange 11a for controlling air pressure application to the clutch booster 7 (will be described in detail).

The contour of the control valve unit 7a is defined by a control body 26 projecting to the right. Inside the control body 26, formed are a control chamber 27 which is coaxially in fluid communication to the control cylinder 25, and an air pressure port 28. In the control chamber 27, accommodated is a sidable control portion 29 of the control piston 24. Likewise, a puppet valve 30 is received in the air pressure port 28 in a sidable manner. A nipple 31 is fitted in the air pressure port 28. A downstream end of an air pipe 67 (FIG. 1) connects to the air nipple 31 so that the pressurized air is always fed thereto.

In a normal condition, the puppet valve 30 is biased to the left by the air pressure and a puppet spring 32, thereby closing a communication port 33 between the control chamber 27 and air pressure port 28. Accordingly, the air pressure from the nipple 31 is interrupted by the puppet valve 30. However, if the oil pressure is fed from the oil pipe 54, the control portion 29 of the control piston 24 causes the puppet valve 30 to move to the right so as to open the communication port 33. Therefore, the air pressure introduced to the control chamber 27 from the communication port 33 is allowed to enter the cylinder shell 12 through the air pipes 34, 35 (FIG. 1), which are in fluid communication with the control chamber 27, and works on an air pressure surface 13a (left face of the piston plate 13) thereby pushing the surface 13a to the right and actuating the clutch 8 to the disengagement direction A.

The clutch booster 7 is able to activate the clutch 8 by a desired amount according to the oil pressure applied thereto. For example, if the oil pressure is increased by a small amount, the piston plate 13 is forced to the right by a pneumatic force, and the hydraulic piston 17 is correspondingly moved to the right a certain stroke. As a result, a volume of the hydraulic passage 20 is enlarged and the oil pressure in the control bore 23 drops. Consequently, a particular balanced situation occurs: the control portion 29 of the control piston 24 pushes the puppet valve 30 while the puppet valve 30 closes the communication port 33. Because of this, a certain air pressure is maintained in the control chamber 27, the air pipes 34, 35, and an air pressure inlet chamber 12b on the left of the air pressure face 13a of the piston plate 13. Therefore, the piston plate 13 and clutch 8 are kept at particular stroke positions, respectively.

If the oil pressure is released completely, the oil pressure in the control chamber 23 further drops and the control piston 24 is returned to the original leftmost position as illustrated. In this situation, the control portion 29 is separated from the puppet valve 30, and a release port 36 in the control portion 29 communicates with the control chamber 27. Then, the air pressure confined is partly introduced to an atmospheric pressure chamber 12a opposite the air pressure inlet chamber 12b via an air pressure port 39 from the release port 36. Consequently, the air pressure pushing the piston plate 13 to the right is now used to push the piston plate 13 to the left with an aid from the return spring 14 so that the clutch 8 is activated toward an engagement direction B. The remaining air pressure is discharged to the outside through a breather 37.

It should be noted here that since the breather 37 includes a check valve which only allows expelling of the air, the atmospheric pressure chamber 12a tends to have a negative pressure during clutch engagement If and therefore the clutch 8 is often not engaged completely. In order to prevent this, part of the air pressure should be introduced to the atmospheric pressure chamber 12a and the remainder be discharged from the breather 37.

Incidentally, reference numeral 38 designates a seal member for partitioning between the cylinder chamber 12a and the hydraulic cylinder 22 in an oil tight manner, reference numeral 40 designates an atmospheric pressure port, and reference numeral 41 designates an unscrewable air bleeder for the working oil.

As may be understood from the foregoing, the control valve portion 7a serves as a hydraulic valve which feeds or discharges the air pressure to or from the clutch booster 7 according to a signal oil pressure from the master cylinder 10 (master cylinder oil pressure) activated in response to movements of the clutch pedal 9.

Figure 3:
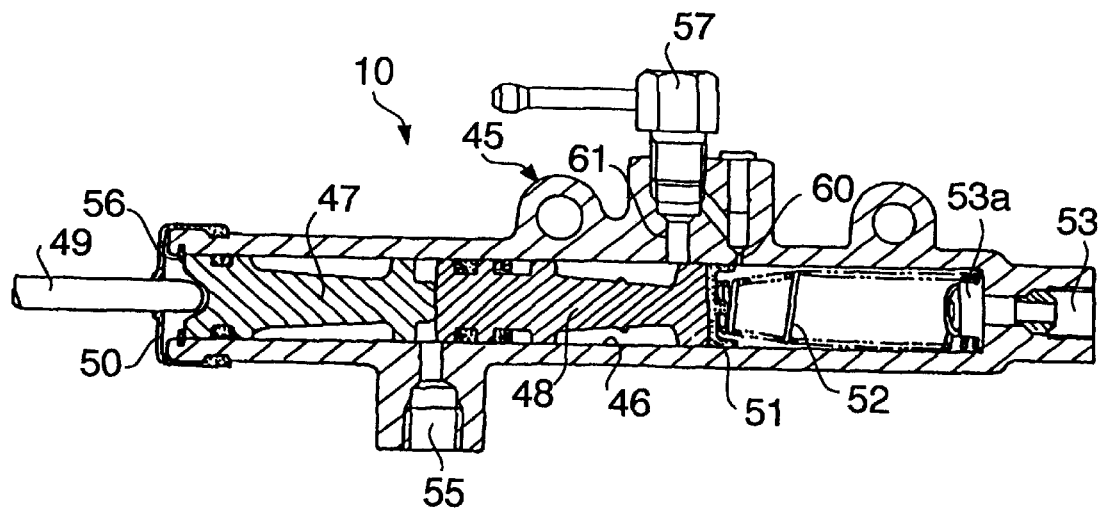
FIG. 3 illustrates an enlarged cross sectional view of a master cylinder utilized in the apparatus shown in FIG. 1.

Referring to FIG. 3, illustrated is a detail of the master cylinder 10 which has a cylinder body 45 elongated in its longitudinal direction. Inside the cylinder body 45, formed is a cylinder bore 46 of predetermined diameter. The cylinder bore 46 sidably receives two independent pistons 47, 48 in tandem. In one end opening (left opening) of the cylinder bore 46, received is a tip of a push rod 49 movable to the right and left in the drawing in response to stamping and releasing of the clutch pedal 9. This left opening is closed by a dust boot 50. In the opposite half (right half) of the cylinder bore 46, received is a return spring 52 for biasing first and second pistons 47, 48 toward the left via a piston cup 51. The right end of the cylinder bore 46 is communicated with an oil pressure supply port 53 formed in the right end of the cylinder body 45. An oil pipe 54 (FIG. 1) connects to this oil pressure port 53. Reference numeral 53a designates a check valve.

In the illustrated condition, the clutch pedal 9 is not stamped so that the first and second pistons 47, 48 are positioned at their original positions respectively. Between the two pistons 47, 48, located is an air pressure inlet port 55 of the cylinder body 45. When the clutch is manually operated using the clutch pedal 9, both the first and second pistons 47, 48 are moved inside the master cylinder 10 to generate the oil pressure. On the other hand, when the clutch is automatically operated, the air pressure is introduced from the air pressure inlet port 55 and the second piston is only activated (will be described in detail). In this case, movement of the first piston 47 is restricted by a snap ring 56. Further, since the first piston 47 does not move, the clutch pedal 9 does not move. Reference numeral 57 designates an oil feed nipple connected to an oil feed pipe 59 extending from a working oil reservoir tank 58 (FIG. 1), reference numeral 60 designates a small port for feeding an oil pressure on the right side of the piston cup 51, and reference numeral 61 designates a large port for feeding an oil pressure to the second piston 48.

Referring back to FIG. 1, an air pipe 62 extends from the air tank 5 and branches to air pipes 62 and 67 at a bifurcation 63. The latter branch line 67 connects to the nipple 31 of the clutch booster 7. On the other hand, the former branch pipe 62 ultimately connects to a shuttle valve 69. On its way to the shuttle valve 69, provided in series are two three-way electromagnetic valves 78, 79. The air pipe 62 includes an upstream portion 62a extending from the air tank 5 to the upstream electromagnetic valve 78, an intermediate portion 62b connecting the upstream and downstream electromagnetic valves 78, 79, and a downstream portion 62c extending from the downstream electromagnetic valve 79 to the shuttle valve 69. An air pressure pipe 64 is connected to the exit of the upstream electromagnetic valve 78. This air pressure pipe 64 extends to the breather 37 of the clutch booster 7. Similarly, an air pressure pipe 68 is connected to the exit of the downstream electromagnetic valve 79. This air pressure pipe 68 is also connected to the intermediate portion 62b of the air pipe 62 at its opposite end.

The three-way valves 78, 79 are switched based on on/off signals (control signals) from the controller 72 respectively. When turned on, the upstream electromagnetic valve 78 connects the upstream pipe segment 62a of the air pipe 62 with the intermediate pipe segment 62b and closes the pipe 64. When turned off, on the other hand, it connects the intermediate pipe segment 62b with the air pipe 64 and closes the upstream pipe segment 62a. The downstream electromagnetic valve 79 connects the intermediate pipe segment 62b with the downstream pipe segment 62c and closes the air pipe 68 when it is turned on, whereas it connects the downstream pipe segment 62c with the air pipe 68 and closes the intermediate pipe segment 62b when it is turned off.

The shuttle valve (double check valve) 69 is a mechanical three-way valve and connects either one of the air pipes 62 and 34 to the air pipe 35 depending upon the air pressure difference between the air pipes 62 and 34.

On the air pipe 68, provided in series are a throttle 66 for reducing a passage in diameter, and a check valve 75 for only allowing the air (air pressure) to move in a particular one direction. The throttle 66 is rather close to the intermediate pipes segment 62b than the check valve 75. The check valve 75 is designed to only allow the air (air pressure) to move in the air pipe 68 from the intermediate pipe segment 62b toward the exit of the downstream electromagnetic valve 79. The opposite flow is restricted or prohibited.

The upstream pipe segment 62a is further branched to an air pipe 70 upstream of the three-way electromagnetic valve 78. This air pipe 70 connects to the master cylinder 10 for air pressure feeding.

Specifically, the air pipe 70 is connected to the air pressure inlet 55 (FIG. 3) of the master cylinder 10 to feed the air pressure on the back (left end face) of the second piston 48 (FIG. 3) or discharge the air pressure therefrom. The air pipe 70 has a bifurcation portion 42 which includes two parallel pipe segments 42a, 42b equipped with check valves 43a, 43b for only allowing the air to flow in a particular direction, respectively.

One of the check valves 43a restricts or prohibits the flow of air toward the master cylinder 10, and the other check valve 43b restricts or terminates the flow of air from the master cylinder 10. For instance, the check valve 43a admits the flow of air therethrough by a spring in the check valve 43a only when the air pressure in the master cylinder 10 becomes greater than that of the air pipe 62.

The air pipe 70 is branched to an air pipe 73 upstream of the dual pipe portion 42. Upstream of this branching, provided is a two-way electromagnetic valve 80. The branch air pipe 73 connects to the downstream pipe segment 62c. The two-way electromagnetic valve 80 simply opens when it is turned on and closes when turned off, unlike the three-way electromagnetic valves 78, 79.

The air pipes 62, 35 connecting the air tank 5, three-way electromagnetic valves 78, 79, shuttle valve 69 and air pressure nipple 15 of the booster 7 in turn, and the air pipes 70, 73 bypass-connecting the upstream pipe segment 62a with the downstream pipes segment 62c forms a first air pressure feed passage "a" for feeding an air pressure to the clutch booster 7 when the clutch 8 is automatically disengaged. In particular, the former two pipes 62, 35 define a main air pressure feed passage "d", and the latter two pipes 70, 73 define a bypass air pressure passage "e".

The air pipes 62, 67, 34, 35 connecting the air tank 5, branching point 63, control valve portion 7a, shuttle valve 69 and air pressure nipple 15 of the booster 7 in turn define a second air pressure feed passage "b" which supplies an air pressure to the booster 7 when the clutch 8 is manually disengaged.

The entire air pipe 70 connecting the upstream pipe segment 62a to the master cylinder 10 defines a third air pressure feed passage "c" for feeding an air pressure to the master cylinder 10 when the clutch 8s is automatically disengaged.

It should be remembered here that the apparatus 1 is also designed to operate with a manual transmission 76. The manual transmission 76 is a common manual transmission and operatively coupled to a shift lever 95 via mechanical elements such as linkages, pins, wires and the like. The manual transmission is manually activated, i.e., its gear position or shift position is changed, in response to movements of the shift lever 95 made by a vehicle driver. However, since the vehicle in this embodiment is a large-size or heavy duty vehicle, a considerable amount of force is needed to move the shift lever 95. In reality, most drivers cannot easily operate the shift lever 95 without a shift assist power. The shift lever 95 has a noddable head such that if a force greater than a predetermined value, i.e., a force over a switch-on threshold, is applied to the shift lever knob, the shift knob swings or "nods" to turn on a knob switch (shift switch) 77 provided inside. This on signal is output to the controller 72 as a shift position (transmission gear position) change signal. In response to this signal, the automatic clutch disengagement is initiated. It should be noted that a similar switch for detecting actuation of the shift lever 95 may be provided on a linkage or similar element operatively coupling the shift lever 95 with the transmission 76.

Between the shift lever 95 and transmission 76, provided is an air pressure assistor 71 for helping the driver actuate the shift lever 95. This assistor 71 is driven by the air pressure supplied thereto, and exerts an assisting force in proportional to the air pressure to lighten the necessary force to be applied to the shift lever 95 by the driver. An air pipe 65 extends to the assistor 71 which is branched from the air pipe 67 for application of air pressure. On the air pipe 65, provided is another three-way electromagnetic valve 90 that is on/off controlled by the controller 72.

The three-way electromagnetic valve 90 is a so-called normal-closed type; the valve 90 connects the upstream half of the air pipe 65 to the downstream half of the same to allow the flow of air through the valve 90 when it is turned on. On the other hand, when turned off, the valve 90 interrupts feeding of the air pressure from the air tank 5, and causes the downstream half of the air pipe 65 to communicate with an air pipe 81, which extends from an outlet of the three-way valve 90, so that the air pressure in the assistor 71 is released to the outside from the breather 37.

The clutch disengagement and engagement apparatus 1 is further equipped with an engine controller for controlling a diesel engine 91. The engine controller in this embodiment is the controller 72, which receives various signals from various sensors to determine an amount of fuel injection and subsequently sends a corresponding control signal to an electronic governor of a fuel injection pump 92. Specifically, an accelerator pedal stroke sensor 82 is attached to an accelerator pedal 99, and the controller 72 determines how much the accelerator pedal is stamped from the output signal of this sensor 82, and increases/decreases the engine rotational speed depending upon this determination. The controller 72 generally utilizes an actual accelerator pedal depression rate as a pseudo accelerator pedal depression rate (i.e., control accelerator pedal depression rate) without any modifications and adjustments, and performs the engine control based on the obtained control accelerator pedal depression rate. The controller 72 determines an optimal control accelerator pedal depression rate independently of the actual accelerator pedal depression rate during the automatic disengagement and engagement of the clutch 8, and controls the engine 91 solely depending upon the optimal control accelerator pedal depression rate.

The controller 72 is also electrically connected to an idle switch 83 located below the accelerator pedal 99, an abnormal switch 84 located near the shift lever 95, a vehicle speed sensor 85 provided near an output shaft of the transmission 76, a pressure switch 86 attached to the air tank 5, a clutch pedal switch 87 and clutch pedal stroke sensor 88 both attached to the clutch pedal 9, and a clutch stroke sensor 88 mounted on the clutch 8. The clutch stroke sensor 88 detects a current position of the clutch.

An engine rotational speed sensor 93 and clutch rotational speed sensor 94 are also connected to the controller 72. The engine rotational speed sensor 93 is located on or in the vicinity of an output shaft of the engine 91 or an input shaft of the clutch 8, and the clutch rotational speed sensor 94 is located on or in the vicinity of an output shaft of the clutch 8 or an input shaft of the transmission 76. These sensors 93, 94 in principle detect the rotational speed of the input and output shafts of the clutch 8 respectively. It should be noted that the controller 72 may be comprised of a plurality of small controllers (e.g., ECU, CPU), each dedicated to a particular element such as the engine 91, clutch 8, etc.

Now, the operation of the clutch disengagement and engagement apparatus 1 of the present embodiment will be described.

The manual disengagement of the clutch 8 is carried out as follows. When the clutch pedal 9 is stamped by a driver, the oil pressure is supplied from the master cylinder 10 to the control valve portion 7a such that the control valve portion 7a connects the air pressure pipes 67 and 34 to each other. Then, the air pressure in the air pipe 34 switches the shuttle valve 69 such that it enters the air pipe 35 and the air pressure inlet chamber 12b of the clutch booster 7. This air pressure pushes the piston plate 13 to disengage the clutch 8. The clutch 8 is disengaged by an amount corresponding to the depression of the clutch pedal 9.

When the clutch 8 is manually engaged, the oil pressure is released in response to the releasing movement of the clutch pedal 9. Eventually, the control valve portion 7a is switched to the release side so that the air pipe 34 is communicated with the atmospheric pressure port 39. Then, the air pressure in the air pressure inlet chamber 12b is introduced into the atmospheric pressure chamber 12a via the pipes 35, 34 whereas the remainder is discharged to the outside from the breather 37. The clutch engagement is thusly complete.

As understood from the above description, the control valve portion 7a functions like a three-way valve which is switched in response to the oil pressure signal (pilot oil pressure) from the master cylinder 10 since it connects the air pipe 34 to either the air pipe 67 or the atmospheric pressure port 39 depending upon the oil pressure signal. The air pressure feed unit 2, second air feed passage "b", booster 7, control valve portion 7a, master cylinder 10, and oil pipes 54, 20 define in combination a manual clutch disengagement and engagement device for manually disengaging and engaging the clutch 8 based on the movements of the clutch pedal 9.

In this particular embodiment, the clutch 8 is only engaged by the manual manner when the vehicle starts moving. This substantially simplifies the overall control and particularly eliminates complicated clutch control at the starting.

Figure 4:
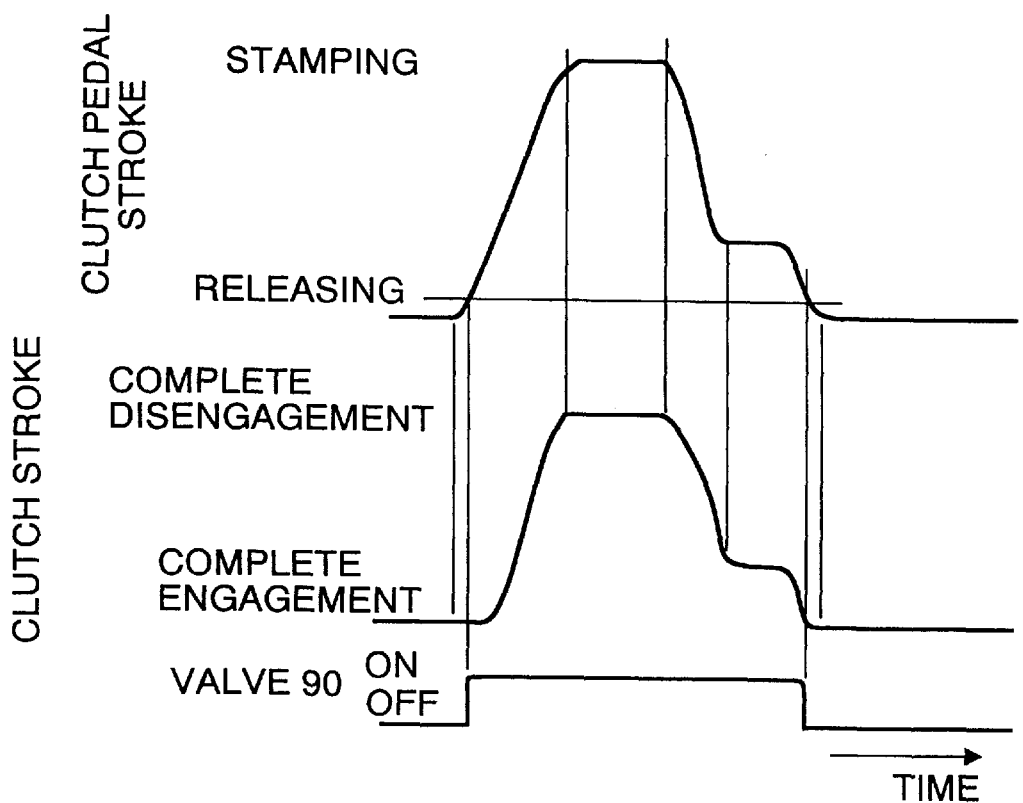
FIG. 4 is a timing chart illustrating how the clutch is manually disengaged and engaged according to the present invention.

The above described manual clutch disengagement and engagement is illustrated in FIG. 4.

The clutch pedal 9 is first slightly depressed within a play and the clutch pedal switch 87 is eventually turned on. Then, the controller 72 recognizes that the driver of the vehicle intends to manually disengage and engage the clutch 8 and maintains the electromagnetic valves 78, 79, 80 in a normal off condition respectively (not shown) while turning on the electromagnetic valve 90. As the electromagnetic valve 90 is turned on, the air pressure assistor 71 is actuated so that the driver is now able to move the shift lever 95 to change the gear position (shift position) of the transmission 76.

The clutch 8 is moved toward the disengagement direction some seconds after the turning on of the clutch pedal switch 87. When the clutch pedal 9 is stamped in a full stroke, the clutch 8 is disengaged completely. The driver then moves the shift lever 95 and changes the gear position of the transmission 76. Subsequent to this, the clutch pedal 9 is released to engage the clutch 8. The clutch pedal switch 87 is turned off just before the clutch pedal 9 is returned to the original position. Upon being informed of this turning off, the controller 72 deactivates the electromagnetic valve 90 and assistor 71. Since the shift assist force is no longer provided, the shift lever 95 becomes extremely heavy so that the shift position change of the transmission 76 is substantially prohibited. In this manner, the shift lock is established.

Next, the automatic disengagement and engagement of the clutch 8 will be described. In the illustrated embodiment, the automatic clutch disengagement and engagement operations are performed only when the shift position of the transmission is changed during cruising. It should be noted, however, that the automatic clutch disengagement and engagement may also be carried out when the vehicle starts if complexity of the control is acceptable.

Figure 5:
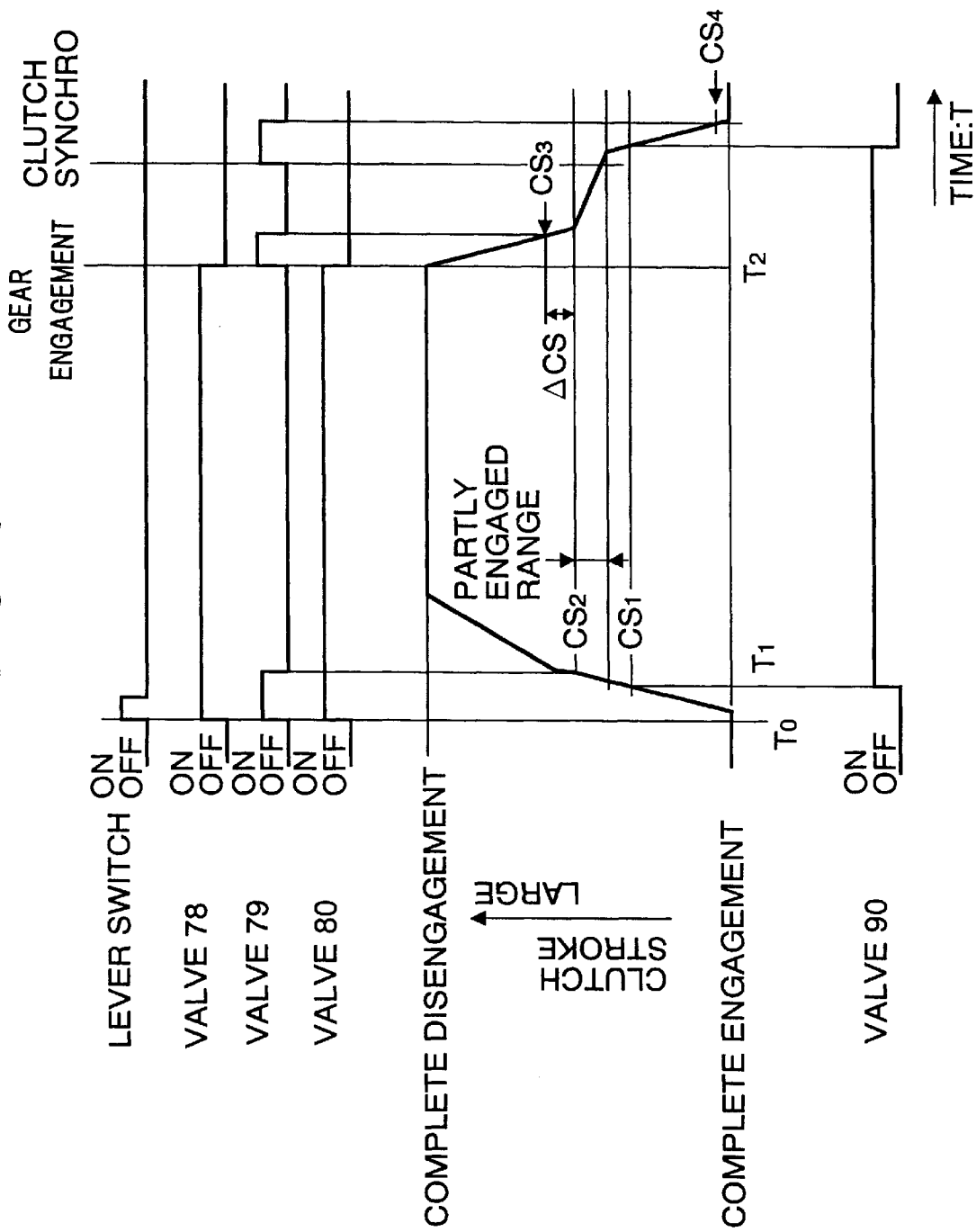
FIG. 5 illustrates a timing chart of how the clutch is disengaged and engaged automatically.

Referring to FIG. 5, depicted is conditions of various switches and valves when the clutch is automatically disengaged and engaged while the transmission shift position (gear position) is being changed. Control values CS1 to CS4 in connection to the clutch stroke are pre-stored in the controller 72.

As illustrated, it should be assumed that the driver moves the shift lever 95 at the time To to start the transmission gear position change. At this point, the electromagnetic valve 90 is in an off condition and the assistor 71 is not activated. Since there is no assisting force, the shift lever 95 itself does not move even if the driver applies a certain force onto the shift lever 95. Instead, the shift lever knob nods so that the knob switch 77 is turned on.

In this manner, a shift position change signal is output from the knob switch 77 to the controller 72, and the controller 72 initiates the automatic disengagement of the clutch 8. Specifically, the controller 72 turns on the electromagnetic valves 78, 79, 80.

Then, the air pressure is supplied to the air pressure inlet chamber 12b of the clutch booster 7 through the first air pressure passage "a", thereby starting the automatic disengagement of the clutch 8. This clutch disengagement is conducted at the highest speed since the air pressure is fed through both of the air pressure passages, i.e., the main air pressure feed passage (air pipes 62, 35) and the bypass passage (air pipes 70, 73).

In the meantime, the air pressure is also introduced into the master cylinder 10 so that the second piston 48 is pushed and the oil pressure passage is pressurized to a certain extent. The oil pressure passage in this context is all the areas filled with the working fluid, including the oil pipes 54, 20 and hydraulic cylinder 22. Referring now to FIG. 2, it is understood that when the clutch is automatically disengaged, the hydraulic piston 17 is forced to the right, and the volume of the hydraulic cylinder 22 filled with the working fluid is increased so that a negative pressure tends to be generated in the oil pressure passage and bubbles might be generated in the working fluid. In this embodiment, however, the master cylinder 10 is actuated by the air pressure when the clutch 8 is automatically disengaged in order to pressurize the fluid in the oil pressure passage. By doing so, it is possible to prevent a negative pressure from being generated in the oil pressure passage. In this case, the check valve 43b is opened to allow the air pressure feeding.

During the clutch disengagement, when the clutch 8 is moved to a position immediately before the engagement-side border of the partly engaged range, i.e., when the clutch stroke reaches an assist threshold CS1 smaller than the minimum value of the clutch partly engaged range (at the time T1), the controller 72 turns on the electromagnetic valve 90 to activate the air pressure assistor 71. The assist threshold CS1 has been determined by experiments and/or computations. It should be noted, however, that there is a certain delay in reality until the assistor 71 generates a sufficient assisting force. In fact, the shift lever cannot be shifted until the clutch 8 passes the partly engaged range and enters the disengaged zone. In other words, the assist threshold CS1 is determined in such a manner.

As the assisting force is exerted, the shift lever becomes light so that the driver can operate the shift lever with a normal force. The driver is then expected to move the shift lever to a gear-disengaged position. This control is executed to establish an appropriate shift lock condition as long as the clutch 8 is engaged. Therefore, it is possible to prevent the forced gear-disengagement of the transmission while the clutch is engaged.

The clutch stroke value CS2 which corresponds to the disengagement-side border of the clutch partly engaged range is stored in the controller 72 by the clutch-stroke-position learning. It is a studied value. During the clutch disengagement, the controller 72 turns off the electromagnetic valve 79 when the clutch stroke reaches this learned value CS2. As a result, the air pressure is given to the clutch booster 7 only from the bypass air line (pipes 70, 73) so that the clutch 8 is disengaged at a high speed, not the highest speed. In other words, the clutch disengagement speed is switched to a slightly slower value.

The reason why the clutch disengagement speed is slowed down is because the piston plate 13 of the booster 7 would collide on a piston stop at a very high speed if the clutch were disengaged at the highest speed continuously. Such collision would reduce the life of the piston plate 13 and associated elements.

When the clutch 8 is completely disengaged, this condition is maintained. In a while, the driver is expected to operate the shift lever 95 into the next gear position. At this point, the electromagnetic valve 79 is in an off condition and the air pressure is allowed to move through the electromagnetic valve 79 in the release direction, but the electromagnetic valve 78 is in an on condition and the air pressure passing through the valve 78 in the feed direction closes the check valve 75. Accordingly, the air pressure discharge from the clutch booster 7 is prohibited.

When the transmission 76 is geared-in (i.e., the shift lever is moved to a certain gear engaged position of the transmission), a signal indicative of this fact is generated by a shift stroke sensor (will be described in detail) provided in the transmission 76 (at the time T2). Upon receiving this signal, the controller 72 starts engaging the clutch 8. Simultaneously, the controller 72 turns off the electromagnetic valve 78 and turns on the electromagnetic valve 79. Then, the air pressure in the clutch booster 7 is released via the air pipe 3, shuttle valve 69, air pipe downstream segment 62c, electromagnetic valve 79, air pipe intermediate segment 62b, electromagnetic valve 78, pipe 64 and breather 37, and the clutch 8 is engaged at a high rate. In the meantime, the air pressure is also released from the master cylinder 10. This air pressure causes the check valve 43a to open, and merges in the air pressure released from the clutch booster 7 via the air pipe 73 before it is expelled to the outside.

Since the air pressure is liberated from the clutch booster 7 and master cylinder 10 in a harmonized manner, it is unnecessary to adjust their release speeds. Further, it prevents a negative pressure from being produced in the oil pressure passage and makes the design and assembling of the apparatus easier. Moreover, since the check valve 43a always renders the air pressure on the master cylinder 10 side higher, the oil pressure passage is completely prevented from having a negative pressure.

When the clutch stroke reaches an engagement speed switching point CS3 during the clutch engagement operation, the controller 72 turns off the electromagnetic valve 79 and changes the clutch engagement speed to a lower value. The engagement rate switch point CS3 is obtained by adding a certain value ΔCS to the learned value CS2. Switching of the clutch engagement rate is performed before the clutch stroke reaches the learned value CS2 in consideration of a delay. If the electromagnetic valve 79 is turned off at this timing, the clutch engagement rate is changed at the same time or before the clutch stroke drops to the learned value CS2. Therefore, the clutch is brought into the partly engaged condition at a low speed so that shocks caused upon clutch engagement is considerably softened or eliminated. It should be noted that the value ΔCS may be varied according to wear of the clutch 8 and/or other factors, and an optimal value for ΔCS may be selected from a plurality of pre-stored ones.

As the electromagnetic valve 79 is turned off, then the air pressure is released through the electromagnetic valve 79, check valve 75, throttle 66, electromagnetic valve 78 and breather 37. Because the air passes the throttled passage 66, the flow speed of the air is slowed down and the clutch 8 is engaged at a low rate.

When the controller 72 determines from the outputs of the engine rotational speed sensor 93 and clutch rotational speed sensor 94 that the rotational speeds of the engine and clutch match and the clutch 8 is in a synchronized condition, it turns on the electromagnetic valve 79 again to engage the clutch 8 at a high speed. This reduces the clutch engagement period.

After that, when the clutch stroke reaches the assist threshold CS1, the controller 72 turns off the electromagnetic valve 90. Then, the air pressure fed to the assistor 71 is released from the breather 37 so that the assisting force is no longer applied to the shift lever. Accordingly, the driver in effect cannot operate the shift lever by his or her hand and the shift lock condition is established.

When the clutch stroke becomes a value CS4 which is immediately prior to the complete engagement, the electromagnetic valve 79 is turned off and the controller 72 is brought into the original stand-by condition. In this manner, a series of automatic clutch disengagement and engagement operations and manual transmission shift position change operations are completed.

As understood from the foregoing, the device for automatically disengaging and engaging the clutch 8 based on various control signals is constituted by the air pressure feed unit 2, first air pressure passage "a" (pipes "d" and "e"), clutch booster 7, electromagnetic valves 78, 79, 80, air pipes 35, 62, 64, 68, 70, 73 and controller 72 in this embodiment.

In the apparatus 1, the manual clutch disengagement and engagement is given priority over the automatic clutch disengagement and engagement. Specifically, even when the automatic clutch disengagement and engagement is performed, the clutch pedal switch 87 is turned on upon stamping of the clutch pedal 9, and the controller 72 turns off the electromagnetic valves 78, 79, 80. As a result, the master cylinder 10 releases the air pressure, but the second air pressure passage "b" feeds the air pressure into the clutch booster 7 so that the clutch 8 is actuated to a certain position in response to the movement of the clutch pedal. The shuttle valve 69 is then switched to the manual side from the automatic side.

Figure 6:
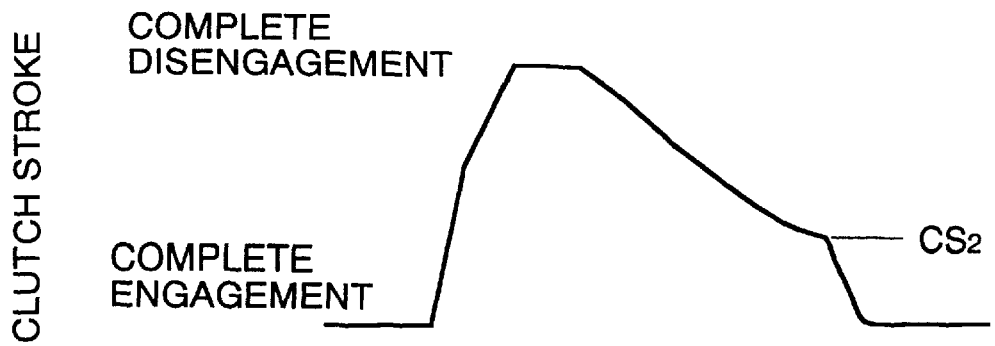
FIG. 6 particularly illustrates a timing chart of clutch automatic disengagement and engagement during the clutch-stroke-position learning.

In order to obtain the value CS2, the apparatus 1 performs the clutch-stroke-position learning in the following manner. FIG. 6 illustrates the conditions of the clutch 8 during the clutch-stroke-position-learning.

First, the controller 72 causes the clutch 8 to be disengaged at the highest speed and then at the high speed when it determines that predetermined study-start conditions are met. Based on the output from the clutch rotational speed sensor 94, the controller 72 waits until the output element of the clutch stops rotating. When the rotation of the clutch stops, the controller 72 causes the clutch 8 to be engaged at the low speed. The clutch 8 is brought into the engaged condition and the rotational speed of the clutch output element is raised to a prescribed threshold value. The clutch stroke CS2 at that time is learned as the disengagement-side border of the partly engaged range. After that, the clutch 8 is automatically engaged at the high rate and the clutch-stroke-position-learning is completed. The study conditions are listed below.

1) System switch is on
   When an ignition key is turned on and battery electricity is fed to the controller 72.
2) Vehicle stops
   When the controller 72 determines from the output of the vehicle speed sensor 85 that the vehicle speed is zero.
3) Engine is operating
   When the controller 72 determines from the output of the engine rotational speed sensor 93 that the engine is rotating.
4) Clutch pedal is not stamped
   When the controller 72 determines that the clutch pedal switch 87 is off.
5) Diagnosis switch is off
   When the controller 72 determines from a diagnosis system that the system is functioning appropriately.
6) Clutch is not operated automatically
   When the controller 72 determines that all the electromagnetic valves 78, 79, 80 are off and the clutch stroke is at or below CS4.
7) Transmission gear position is neutral
   When the controller 72 determines from the below described method that the transmission 76 is in a neutral condition.
8) Intended transmission gear position is neutral
   When the controller 72 determines that the knob switch 77 is off and no gear position change is performed.
9) Study flag is raised
   When the above 1) to 8) are met and the controller 72 raises a flag indicating that the clutch-stroke-position-learning is ready to start.

When the clutch is disengaged during the clutch-stroke-position learning, the driver may operate the shift lever 95 to a certain gear engaged position of the transmission 76. If it is the case, the vehicle would start upon engagement of the clutch 8. However, this is not desirable. In this embodiment, the clutch-stroke-position learning is terminated when the shift lever 95 is moved to a gear engaged position while the clutch-stroke-position learning is proceeding. In general, the shift lever 95 moves in an "H" patter as illustrated in FIG. 1. Thus, the shift lever 95 is operated in up and down directions in the drawing or "H" pattern when it is moved to a gear engaged position.

The movement of the shift lever 95 is detected by the knob switch 77. Specifically, when the knob switch 77 is turned on during the clutch-stroke-position learning, the learning is interrupted since there is a possibility of gear engagement of the transmission.

Figure 7:
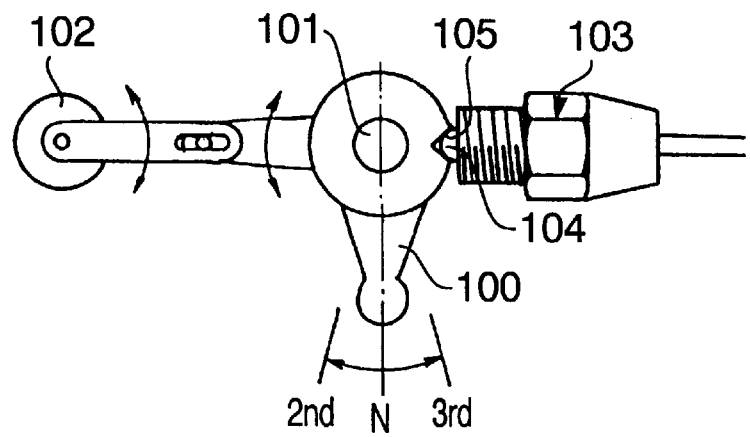
FIG. 7 illustrates an enlarged view of a gear position change mechanism of a transmission in the apparatus shown in FIG. 1.

Two alternative methods will be described below. Referring to FIG. 7, the manual transmission is equipped with a shifter lever 100 which serves as a shift position change unit. The shifter lever 100 is operatively connected to the shift lever 95 via links (not shown) and the assistor 71 such that it rotates about a shaft 101 in response to the movement of the shift lever 95 in the gear engaged position. The positions N, $2^{nd}$ and $3^{rd}$ in FIG. 7 correspond to the neutral, second gear and third gear positions of the transmission 76 respectively. It should be noted that the $2^{nd}$ position is one example of the shift positions to be selected when a driver moves the shift lever forward if the shift lever set is a floor shift type, and the $3^{rd}$ position is one example to be selected when a driver moves the shift lever backward.

Figure 8:
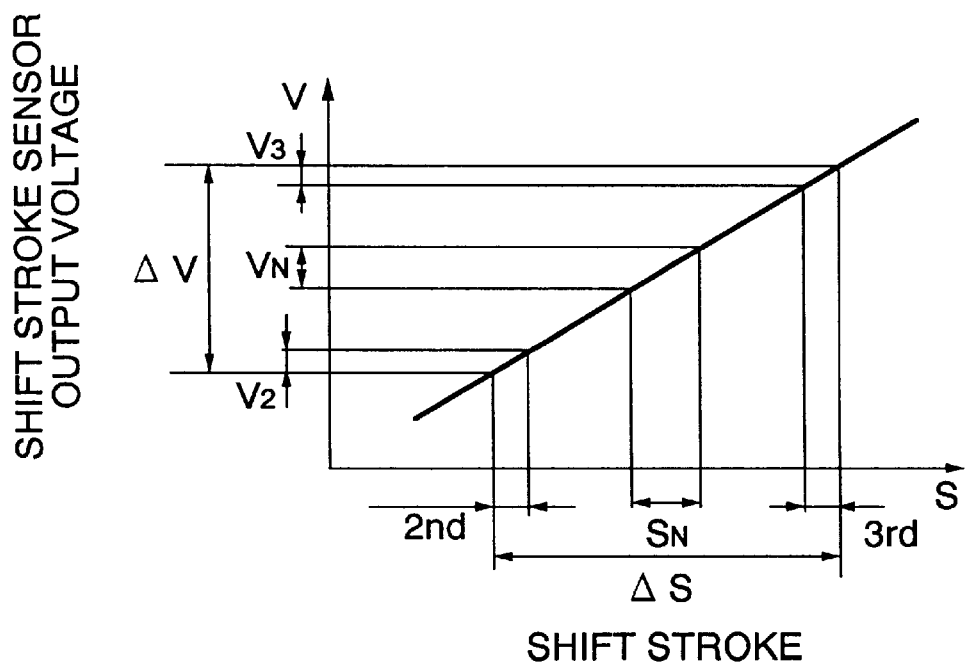
FIG. 8 is a diagram showing relationship between a shift stroke and an output voltage of a shift stroke sensor.

The amount of rotation of the shifter lever 100, i.e., the shifting stroke of the transmission 76, is detected by a shift stroke sensor 102. As illustrated in FIG. 8, the shift stroke sensor 102 outputs a voltage V in proportion to the shift stroke S. The output voltage $\Delta V$ corresponds to the whole stroke $\Delta S$. The controller 72 determines that the transmission 76 is in the neutral position if the voltage value falls in the range $V_N$, in the second gear position if the voltage value is in the range $V_2$, and in the third gear position if the voltage value is in the range $V_3$. These ranges $V_N$, $V_2$ and $V_3$ are determined to conform with the transmission 76 actually employed.

The output voltage of the shift stroke sensor 102 is compared with the range $V_N$. If it does not fall within the range $V_N$, the controller 72 determines that the shift lever 95 has been operated, and interrupts the learning.

It should be noted that the movement of the shift lever 95 in right and left directions in FIG. 1 is also detected by a select stroke sensor (not shown). However, even if an output voltage of this sensor varies, the transmission 76 is still in the neutral condition so that this output voltage has no influence with respect to the apparatus 1. Accordingly, description about this sensor is omitted here.

The neutral condition of the transmission 76 is detected by the neutral switch 103. Specifically, when the shifter lever 100 is in the neutral position, a ball 104 of the neutral switch 103 is received in a V-shaped recess (detent) 105 of the shifter lever 100 so that the neutral switch 103 is turned on. Upon knowing this condition of the switch 103, the controller 72 determines that the transmission 76 is in the neutral condition. On the other hand, if the shift lever 95 is moved in a gear engaged position and the shifter lever 100 rotates so that the ball 104 moves out of the detent groove 105, then the ball 104 is retracted and the neutral switch 103 is turned off. The controller 72 now determines that the transmission 76 is not in the neutral condition.

Therefore, when the neutral switch 103 is in an off condition, the controller 72 determines that the shift lever 95 has been operated and interrupts the clutch-stroke-position-learning.

Figure 9:
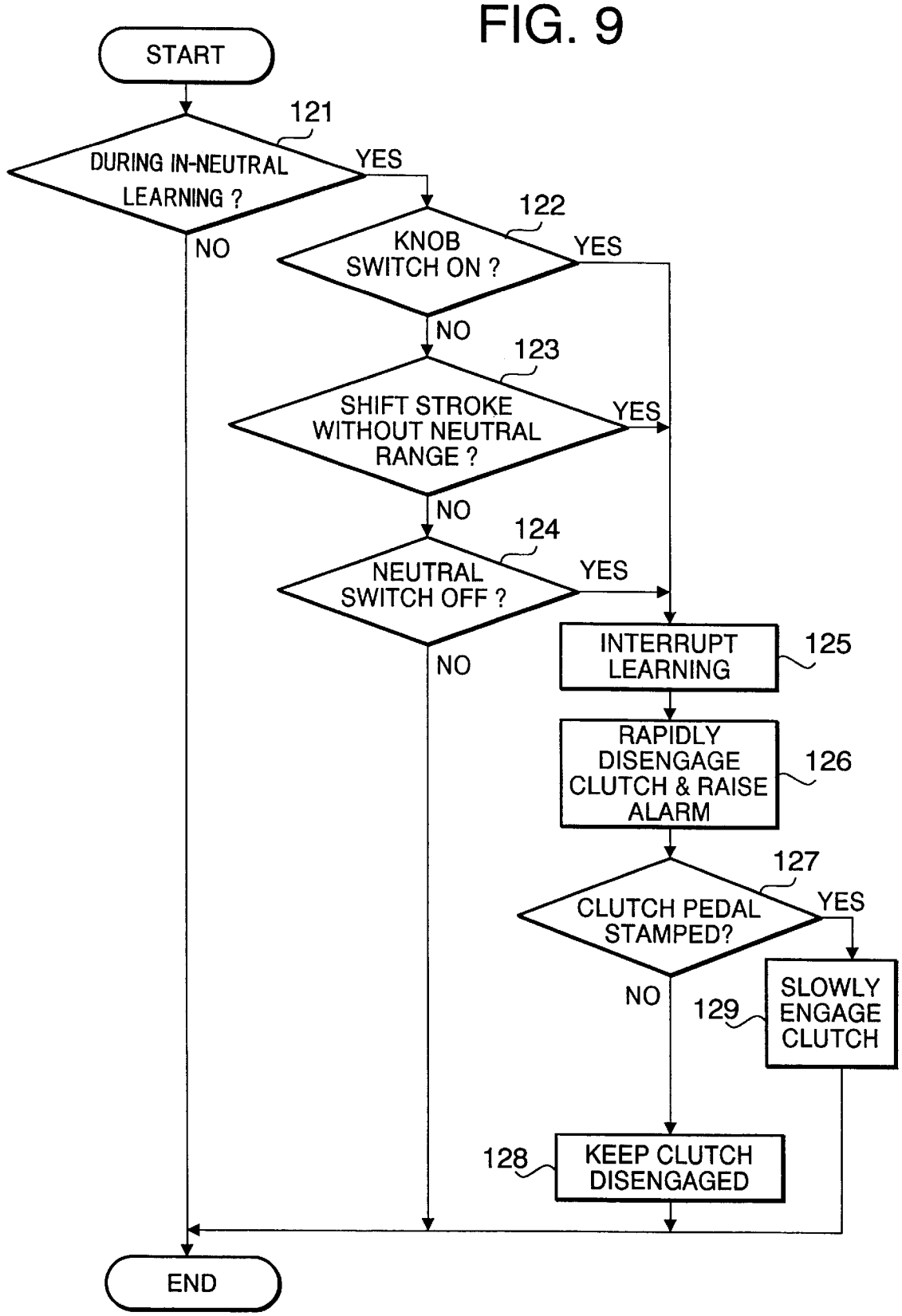
FIG. 9 depicts a flowchart of exemplary control operation executed to prevent unintentional starting of a vehicle according to the present invention.

Referring to FIG. 9, illustrated is a flowchart for executing a fail-safe control to prevent an unexpected starting of the vehicle.

The controller 72 first determines at Step 121 whether or not the clutch-stroke-position learning is being conducted. If the answer is no, this program is terminated. If yes, the program proceeds to Step 122.

Step 122 determines whether the knob switch 77 is turned on. If the knob switch 77 is off, the program advances to Step 123 to determine whether the shift stroke is outside the neutral range, i.e., whether the output voltage of the shift stroke sensor 102 is outside the range $V_N$. If it falls in the range $V_N$, the program goes to Step 124 to determine if the neutral switch 103 is off. If the switch 103 is on, the program is terminated. In this case, the shift lever 95 has not been operated during the clutch-stroke-position learning and it is a normal condition.

On the other hand, if it is determined at Step 122 that the knob switch 77 is turned on, if it is determined at Step 123 that the shift stroke is not within the neutral range, or if it is determined at Step 124 that the neutral switch 103 is off, the program proceeds to Step 125 to interrupt the clutch-stroke-position learning. This is because in each of the above three cases, there is a possibility that the shift lever 95 is moved in a certain gear engaged position during the clutch-stroke-position-learning. Interruption of the clutch-stroke-position-learning means that the study flag is lowered.

After interrupting the clutch-stroke-position-learning, the program proceeds to Step 126 to automatically disengage the clutch 8 at the high or highest speed and turn on an alarm buzzer in a passenger compartment of the vehicle thereby cautioning the driver. Alarming is needed since the driver intends to do what he or she should not do. Then the program advances to Step 127 to determine whether the clutch pedal 10 is stamped. This step is needed to enable manual clutch engagement thereafter. In such a case, it is determined from the output of the clutch pedal stroke sensor 89 whether the clutch pedal 10 has been depressed to a sufficient extent to disengage the clutch 8. If the clutch pedal 10 is stamped enough, the program proceeds to Step 129 to automatically engage the clutch 8 at the low speed. When the automatic clutch disengagement and engagement operation intervenes with the manual operation as described above, the manual operation is given priority so that the clutch 8 is disengaged according to the stamping of the clutch pedal 10. If the clutch pedal 10 is not stamped, the clutch 8 is maintained in the disengaged condition at Step 128. According to this control, the clutch 8 is reliably brought into the disengaged state and therefore the vehicle will not start even if the shift lever is moved to a certain gear engaged position.

Figure 10:
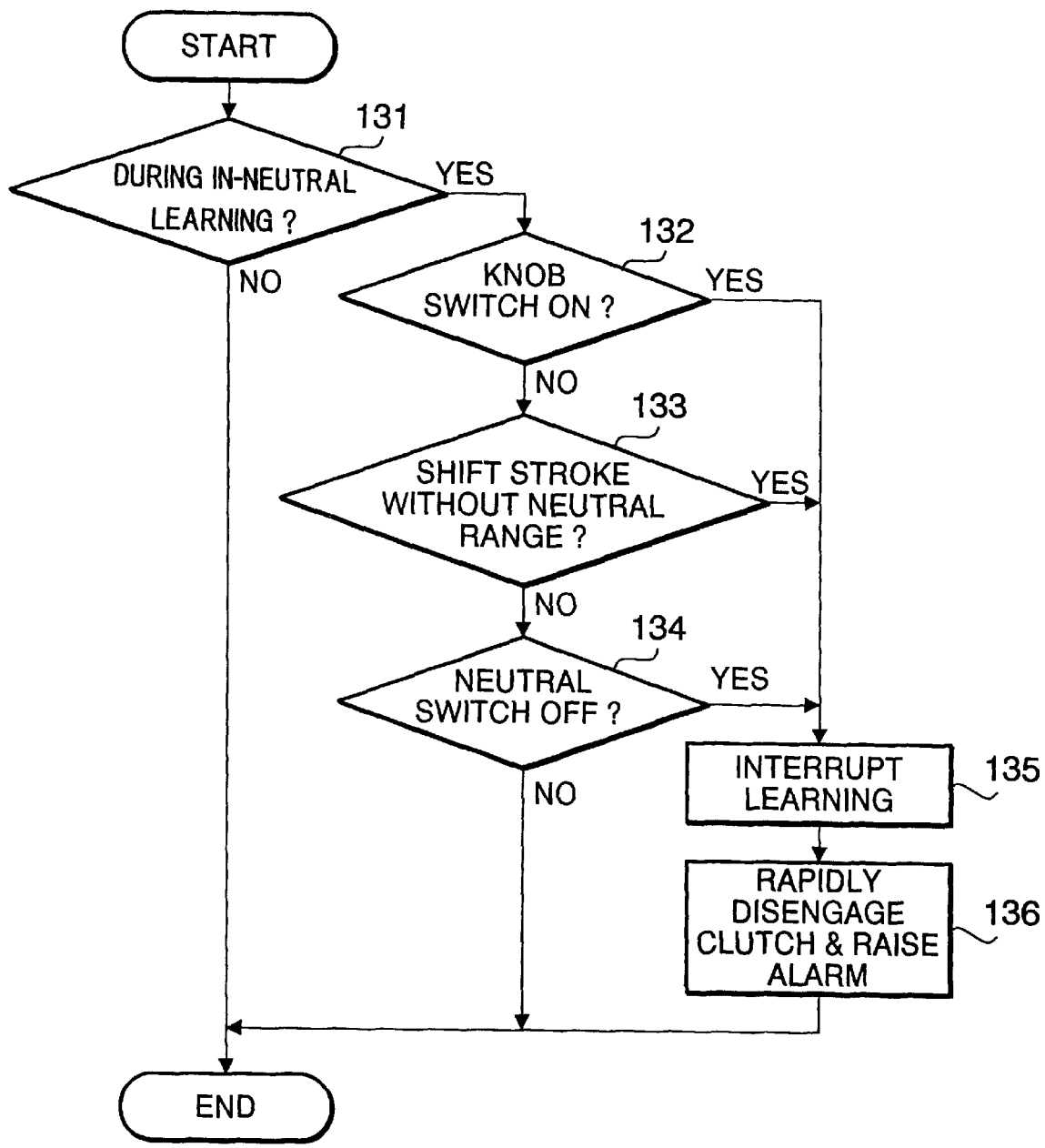
FIG. 10 illustrates a similar flowchart showing another example of operation to prevent the vehicle from unexpectedly starting according to the invention.

Referring now to FIG. 10, illustrated is another flowchart for modified control. Steps 131 to 135 are the same as Steps 121 to 125 in FIG. 9. The only different step is Step 136. After the clutch-stroke-position-learning is interrupted at Step 135, the clutch 8 is automatically engaged at a high speed and the alarm is turned on at Step 136. This is necessary because there is a possibility that the transmission gear engagement operation has not been completed even if the knob switch 77 is on, the shift stroke is outside the neutral range or the neutral switch 103 is off. In such a case, if the clutch 8 is rapidly engaged, the transmission gear engagement operation is disabled, gear noises are generated, and the vehicle will not start.

On the other hand, if the shift lever movement to the gear engaged position has been completed already, the vehicle will start upon high speed engagement of the clutch. Practically, however, the vehicle will not start since a park or foot brake is generally applied; the engine stops even if the clutch is engaged. Nevertheless, it is true that there is an undesirable possibility that the vehicle will start.

Figure 11:
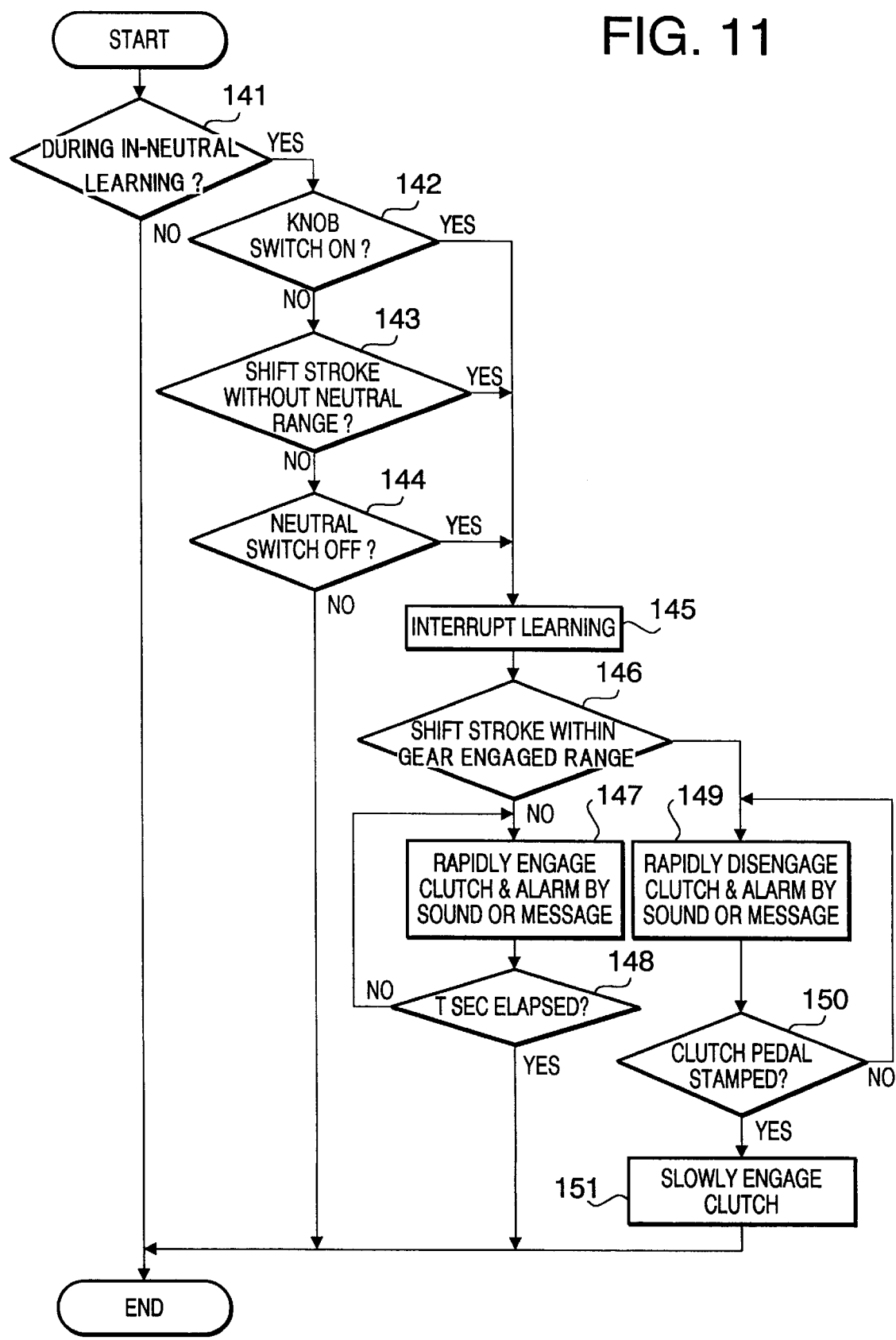
FIG. 11 is a flowchart showing still another embodiment of operation to prevent inadvertent starting of the vehicle.

In consideration of the above, there is another way of control as depicted in FIG. 11. Steps 141 to 144 are the same as Steps 121 to 124 in FIG. 9. Although the clutch-stroke-position-learning is stopped at Step 145, it means that the study flag is lowered and the clutch 8 is kept in a current condition in this flowchart. After Step 145, it is determined at Step 146 whether the shift stroke (shift lever position) is within the during-gear-in-movement range, i.e., whether the output voltage of the shift stroke sensor 102 falls within the range $V_2$ or $V_3$.

If the answer at Step 146 is yes, then the program proceeds to Step 149 to disengage the clutch 8 at a high speed, like Step 126. This prevents the vehicle from starting. Subsequent to this, the driver is alarmed by sound or message. The program then advances to Step 150 to determine whether the clutch pedal 10 has been depressed, like Step 127. If the answer is no, the program waits until the clutch pedal 10 is stamped by repeating Step 149. Upon stamping of the clutch pedal 10, the program proceeds to Step 151 to slowly engage the clutch 8, like Step 129. This brings the clutch 8 into the manual mode, and the program is terminated.

On the other hand, if it is determined at Step 146 that the shift stroke is not in the during-gear-in-movement range, then the program proceeds to Step 147 to quickly engage the clutch 8, like Step 136. Since the shift lever is not moved to a gear engaged position, it is safe even if the clutch 8 is engaged. After that, the gear engagement of the transmission is disabled so that the vehicle cannot start. It should be noted that the driver is also alarmed by sound or message at Step 147 like Step 149. After Step 147, the program proceeds to Step 148 to determine whether a predetermined period T elapses. If not, Step 147 is repeated. When the time T has passed, the program is terminated.

According to this control, whether the clutch should be engaged at a high speed or disengaged at a high speed is determined based on whether the shift lever is moved to a certain gear engaged position or not. Therefore, an optimal clutch control and vehicle-start prevention control are executed in accordance with actual conditions of the transmission.

The illustrated and described arrangement is disclosed in Japanese Patent Application No. 10-307629 filed on Oct. 28, 1998, the subject application claims priority of this Japanese Patent Application, and the entire disclosure thereof is incorporated herein by reference.

What is claimed is:

1. A vehicle having a clutch and a manual transmission comprising:
   an apparatus for automatically disengaging and engaging the clutch; and
   control means for controlling the apparatus to automatically disengage and engage the clutch, the control means including:
   clutch-stroke-position learning means for learning a starting position of a partly engaged range of the clutch while the manual transmission is in a neutral position, and interruption means for interrupting an operation of the clutch-stroke-position learning means when a shift lever of the manual transmission is moved toward a gear engaged position.

2. The vehicle according to claim 1, wherein the interruption means includes a lever movement detector for detecting the movement of the shift lever, and the lever movement detector includes a knob switch responsive to a force of predetermined value applied to the shift lever, a shift stroke sensor for detecting a shifting stroke of the manual transmission, or a neutral switch for detecting a neutral condition of the manual transmission.

3. The vehicle according to claim 1, wherein the learning means learns a starting position of a partly engaged range of the clutch by automatically disengaging the clutch after predetermined study conditions are met, then automatically engaging the clutch, and detecting a clutch stroke position at which a rotational speed of an output element of the clutch reaches a prescribed value.

4. The vehicle according to claim 1, wherein the apparatus automatically disengages the clutch after interrupting the operation of the clutch-stroke-position learning means.

5. The vehicle according to claim 1 further including means for raising an alarm after interrupting the operation of the clutch-stroke-position learning means.

6. The vehicle according to claim 1, wherein the apparatus automatically disengages the clutch if the manual transmission is in a gear engaged position after interrupting the operation of the clutch-stroke-position learning means, whereas the apparatus automatically engages the clutch if the manual transmission is not in the gear engaged position.

7. The vehicle according to claim 1 further including a manual disengaging and engaging apparatus for manually disengaging and engaging the clutch based on depression of a clutch pedal, the manual clutch disengagement and engagement being given priority over the automatic disengagement and engagement, and wherein the clutch is engaged if the clutch pedal is depressed after interrupting the operation of the clutch-stroke-position learning means, whereas the clutch is maintained in a disengaged condition if the clutch pedal is not depressed.

* * * * *